US012562876B2

(12) United States Patent
Bagheri et al.

(10) Patent No.: US 12,562,876 B2
(45) Date of Patent: Feb. 24, 2026

(54) METHOD AND APPARATUS INCLUDING SEARCH SPACE SWITCHING FOR ULTRA-RELIABLE LOW-LATENCY COMMUNICATION

(71) Applicant: Lenovo (Singapore) Pte. Limited, New Tech Park (SG)

(72) Inventors: Hossein Bagheri, Urbana, IL (US); Hyejung Jung, Northbrook, IL (US); Vijay Nangia, Woodridge, IL (US)

(73) Assignee: Lenovo (Singapore) Pte. Limited, New Tech Park (SG)

( * ) Notice: Subject to any disclaimer, the term of this patent is extended or adjusted under 35 U.S.C. 154(b) by 373 days.

(21) Appl. No.: 17/924,676

(22) PCT Filed: May 13, 2021

(86) PCT No.: PCT/US2021/032350
§ 371 (c)(1),
(2) Date: Nov. 10, 2022

(87) PCT Pub. No.: WO2021/231805
PCT Pub. Date: Nov. 18, 2021

(65) Prior Publication Data
US 2023/0188305 A1      Jun. 15, 2023

Related U.S. Application Data

(60) Provisional application No. 63/024,493, filed on May 13, 2020.

(51) Int. Cl.
*H04W 4/00* (2018.01)
*H04L 5/00* (2006.01)

(52) U.S. Cl.
CPC .......... *H04L 5/0092* (2013.01); *H04L 5/0051* (2013.01); *H04L 5/0098* (2013.01)

(58) Field of Classification Search
None
See application file for complete search history.

(56) References Cited

U.S. PATENT DOCUMENTS

2021/0218503 A1*   7/2021   Babaei .................... H04L 1/08
2021/0329679 A1*  10/2021   Hosseini ............. H04W 72/569

FOREIGN PATENT DOCUMENTS

WO        2011120278 A1    10/2011
WO        2019184681 A1    10/2019
WO        2020033660 A1     2/2020

OTHER PUBLICATIONS

PCT International Search Report for PCT/US2021/032350, Lenovo (United States) Inc., mailing date—Aug. 31, 2021.
(Continued)

*Primary Examiner* — Zewdu A Beyen
(74) *Attorney, Agent, or Firm* — FIG. 1 Patents

(57) ABSTRACT

A first uplink cancellation configuration for a downlink bandwidth part is received (302). Based on the first uplink cancellation configuration, a first reference time duration associated with a first set of uplink cancellation indications detected in a first set of search spaces is determined (304). A second reference time duration associated with a second set of uplink cancellation indications detected in a second set of search spaces is determined (306). Receipt of an uplink cancellation indication is monitored for (308) in at least one of the search spaces. A particular one of the reference time durations is selectively used (310) in connection with a received uplink cancellation indication dependent upon which one of the first set of search spaces and the second set of search spaces, that is being monitored, is identified as including the uplink cancellation indication.

20 Claims, 5 Drawing Sheets

100

130

120

110

(56) References Cited

OTHER PUBLICATIONS

3GPP TS 38.133 V16.3.0 (Mar. 2020), 3rd Generation Partnership Project; Technical Specification Group Radio Access Network; NR; Requirements for support of radio resource management (Release 16).

3GPP TS 38.211 V16.1.0 (Mar. 2020), 3rd Generation Partnership Project; Technical Specification Group Radio Access Network; NR; Physical channels and modulation (Release 16).

3GPP TS 38.212 V16.1.0 (Mar. 2020), 3rd Generation Partnership Project; Technical Specification Group Radio Access Network; NR; Multiplexing and channel coding (Release 16).

3GPP TS 38.213 V16.1.0 (Mar. 2020), 3rd Generation Partnership Project; Technical Specification Group Radio Access Network; NR; Physical layer procedures for control (Release 16).

3GPP TS 38.214 V16.1.0 (Mar. 2020), 3rd Generation Partnership Project; Technical Specification Group Radio Access Network; NR; Physical layer procedures for data (Release 16).

3GPP Ts 38.331 V16.0.0 (Mar. 2020), 3rd Generation Partnership Project; Technical Specification Group Radio Access Network; NR; Radio Resource Control (RRC) protocol specification (Release 16).

"Foreign Office Action", CN Application No. 202180040716.2, Feb. 28, 2025, 11 pages.

* cited by examiner

100

130

120

Network

110

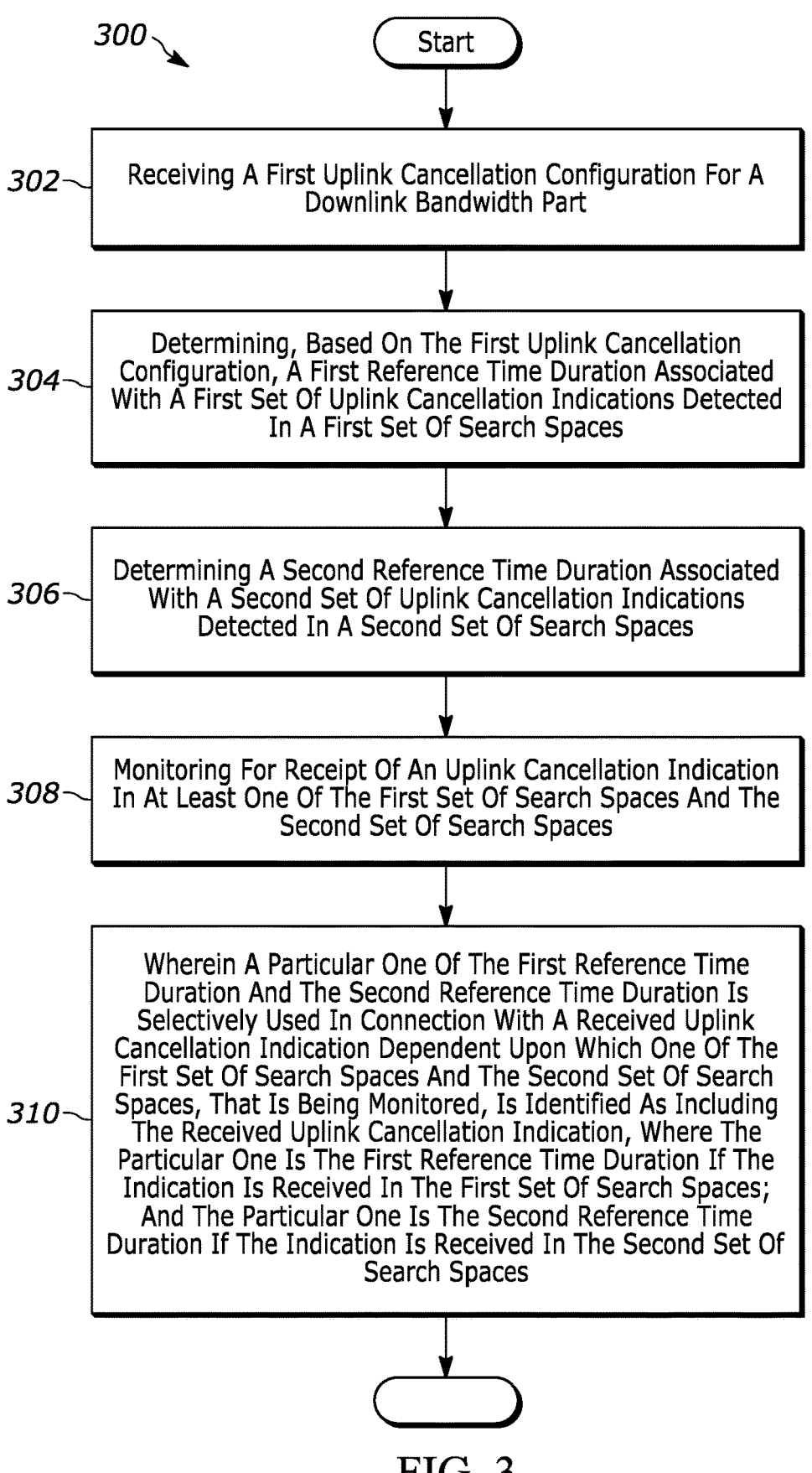

*300*

Start

302 — Receiving A First Uplink Cancellation Configuration For A Downlink Bandwidth Part 304 — Determining, Based On The First Uplink Cancellation Configuration, A First Reference Time Duration Associated With A First Set Of Uplink Cancellation Indications Detected In A First Set Of Search Spaces 306 — Determining A Second Reference Time Duration Associated With A Second Set Of Uplink Cancellation Indications Detected In A Second Set Of Search Spaces 308 — Monitoring For Receipt Of An Uplink Cancellation Indication In At Least One Of The First Set Of Search Spaces And The Second Set Of Search Spaces 310 — Wherein A Particular One Of The First Reference Time Duration And The Second Reference Time Duration Is Selectively Used In Connection With A Received Uplink Cancellation Indication Dependent Upon Which One Of The First Set Of Search Spaces And The Second Set Of Search Spaces, That Is Being Monitored, Is Identified As Including The Received Uplink Cancellation Indication, Where The Particular One Is The First Reference Time Duration If The Indication Is Received In The First Set Of Search Spaces; And The Particular One Is The Second Reference Time Duration If The Indication Is Received In The Second Set Of Search Spaces

FIG. 3

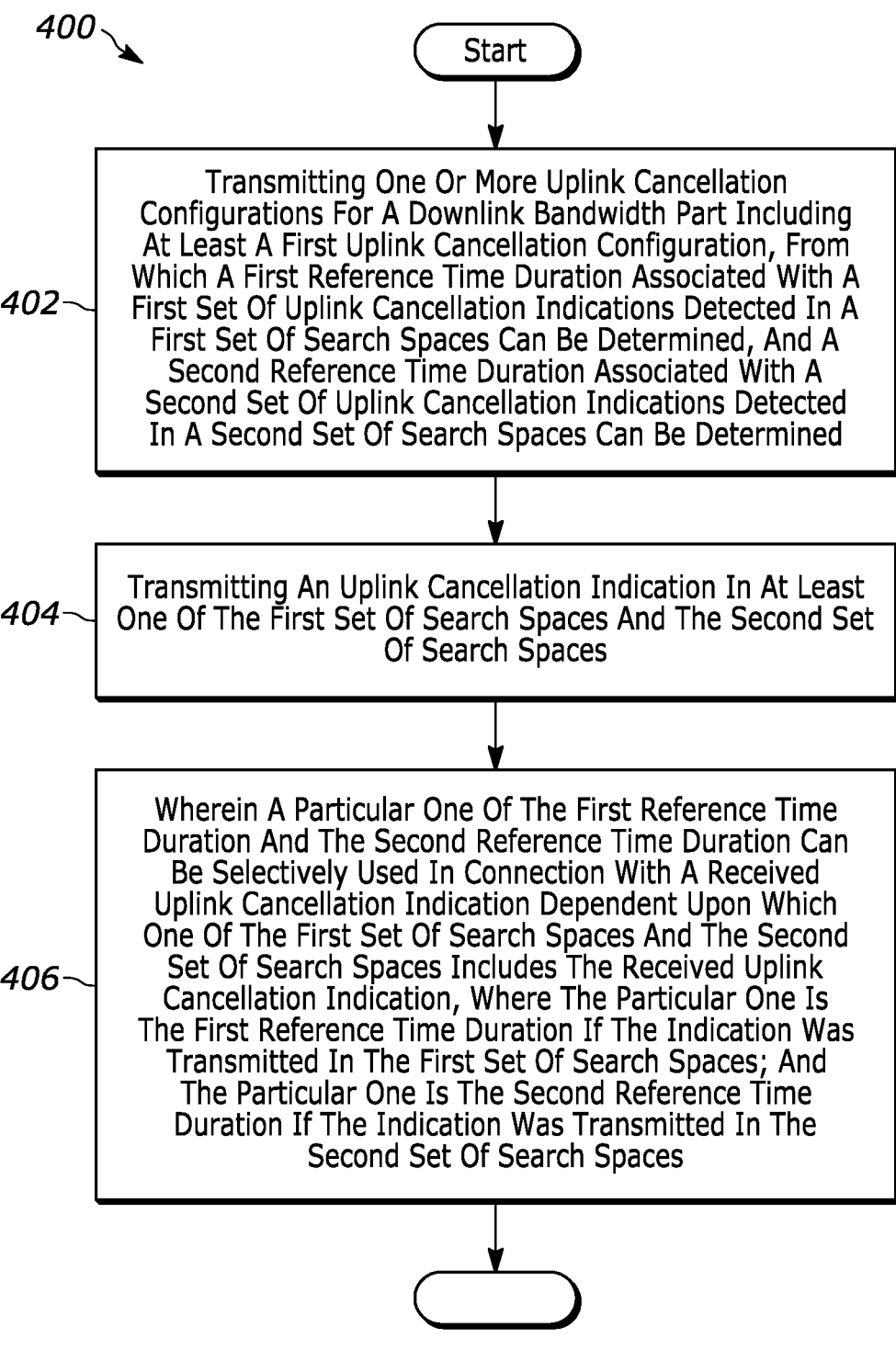

*400*

Start

402 — Transmitting One Or More Uplink Cancellation Configurations For A Downlink Bandwidth Part Including At Least A First Uplink Cancellation Configuration, From Which A First Reference Time Duration Associated With A First Set Of Uplink Cancellation Indications Detected In A First Set Of Search Spaces Can Be Determined, And A Second Reference Time Duration Associated With A Second Set Of Uplink Cancellation Indications Detected In A Second Set Of Search Spaces Can Be Determined 404 — Transmitting An Uplink Cancellation Indication In At Least One Of The First Set Of Search Spaces And The Second Set Of Search Spaces 406 — Wherein A Particular One Of The First Reference Time Duration And The Second Reference Time Duration Can Be Selectively Used In Connection With A Received Uplink Cancellation Indication Dependent Upon Which One Of The First Set Of Search Spaces And The Second Set Of Search Spaces Includes The Received Uplink Cancellation Indication, Where The Particular One Is The First Reference Time Duration If The Indication Was Transmitted In The First Set Of Search Spaces; And The Particular One Is The Second Reference Time Duration If The Indication Was Transmitted In The Second Set Of Search Spaces

FIG. 4

METHOD AND APPARATUS INCLUDING SEARCH SPACE SWITCHING FOR ULTRA-RELIABLE LOW-LATENCY COMMUNICATION

FIELD OF THE INVENTION

The present disclosure is directed to a method and apparatus including the configuration of search space switching between multiple sets of search spaces for monitoring for the receipt of an uplink cancellation indication, such as in support of ultra-reliable low-latency communications.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Evolved Universal Terrestrial Radio Access (E-UTRA), Long Term Evolution (LTE), Universal Mobile Telecommunications Service (UMTS), Global System for Mobile Communication (GSM), and/or Enhanced Data GSM Environment (EDGE).

In order to better support applications that can have more time sensitive communication, where both reliability and latency are an issue, there has been an increasing focus on a type of communication identified as ultra-reliable low-latency communications (URLLC). While traditionally, data reliability and latency could be traded off, so as to better support one or the other. Increasingly, applications are desiring that performance relative to both factors be simultaneously enhanced.

When a desired ultra-reliable low-latency communication has been identified, there is a motivation to be able to support the communication with as little delay as possible. In shared spectrum operation, resources are continuously being allocated to the various user equipment operating within the shared spectrum. It is possible that some of the resources in the shared spectrum will have already been assigned to user equipment in support of communications that may not be as time sensitive, when a request for resources in support of an ultra-reliable low-latency communication is received. In some of these instances, it may be possible to send an uplink cancellation indication, to free up the already assigned resourced in order to be able to make them available for the ultra-reliable low-latency communication. However, monitoring for the possibility of receiving an uplink cancellation indication comes at a cost in terms of resources, such as processing resources, as well as power resources, where more frequent monitoring can come with a higher cost.

The present inventors have recognized that it may be desirable to be able to define for each of multiple different sets of search spaces a respective uplink cancellation configuration, that can vary the nature of the monitoring associated with each of the respective sets of search spaces including potential differences in monitoring periodicity, reference time duration, as well as the corresponding relationship to one or more associated physical downlink control channel monitoring occasions, which in turn can help to better manage the resource requirements associated with monitoring for uplink cancellation indications in each of the respective sets of search spaces, as well as manage the ability to be able to support ultra-reliable low-latency communications therein.

SUMMARY

The present application provides a method in a user equipment. The method includes receiving a first uplink cancellation configuration for a downlink bandwidth part. Based on the first uplink cancellation configuration, a first reference time duration associated with a first set of uplink cancellation indications detected in a first set of search spaces is determined. A second reference time duration associated with a second set of uplink cancellation indications detected in a second set of search spaces is determined. Receipt of an uplink cancellation indication is monitored for in at least one of the first set of search spaces and the second set of search spaces. A particular one of the first reference time duration and the second reference time duration is selectively used in connection with a received uplink cancellation indication dependent upon which one of the first set of search spaces and the second set of search spaces, that is being monitored, is identified as including the received uplink cancellation indication. The particular one is the first reference time duration if the indication is received in the first set of search spaces, and the particular one is the second reference time duration if the indication is received in the second set of search spaces.

According to another possible embodiment, a user equipment is provided. The user equipment includes a transceiver that receives a first uplink cancellation configuration for a downlink bandwidth part. The user equipment further includes a controller that determines, based on the first uplink cancellation configuration, a first reference time duration associated with a first set of uplink cancellation indications detected in a first set of search spaces, and determines a second reference time duration associated with a second set of uplink cancellation indications detected in a second set of search spaces. Receipt of an uplink cancellation indication is monitored for in at least one of the first set of search spaces and the second set of search spaces. A particular one of the first reference time duration and the second reference time duration is selectively used in connection with a received uplink cancellation indication dependent upon which one of the first set of search spaces and the second set of search spaces, that is being monitored, is identified as including the received uplink cancellation indication. The particular one is the first reference time duration if the indication is received in the first set of search spaces. The particular one is the second reference time duration if the indication is received in the second set of search spaces.

According to a further possible embodiment, a method in a network entity is provided. The method includes transmitting one or more uplink cancellation configurations for a downlink bandwidth part including at least a first uplink cancellation configuration, from which a first reference time duration associated with a first set of uplink cancellation indications detected in a first set of search spaces can be determined, and a second reference time duration associated with a second set of uplink cancellation indications detected in a second set of search spaces can be determined. An uplink cancellation indication is transmitted in at least one of the first set of search spaces and the second set of search spaces. A particular one of the first reference time duration and the second reference time duration can be selectively used in connection with a received uplink cancellation indication dependent upon which one of the first set of search spaces and the second set of search spaces includes the received uplink cancellation indication. The particular one is the first reference time duration if the indication was transmitted in the first set of search spaces. The particular one is the second reference time duration if the indication was transmitted in the second set of search spaces.

According to a still further possible embodiment, a network entity is provided. The network entity includes a controller, and a transceiver that transmits one or more uplink cancellation configurations for a downlink bandwidth part including at least a first uplink cancellation configuration, from which a first reference time duration associated with a first set of uplink cancellation indications detected in a first set of search spaces can be determined, and a second reference time duration associated with a second set of uplink cancellation indications detected in a second set of search spaces can be determined, and that transmits an uplink cancellation indication in at least one of the first set of search spaces and the second set of search spaces. A particular one of the first reference time duration and the second reference time duration can be selectively used in connection with a received uplink cancellation indication dependent upon which one of the first set of search spaces and the second set of search spaces includes the received uplink cancellation indication. The particular one is the first reference time duration if the indication was transmitted in the first set of search spaces. The particular one is the second reference time duration if the indication was transmitted in the second set of search spaces.

These and other features, and advantages of the present application are evident from the following description of one or more preferred embodiments, with reference to the accompanying drawings.

BRIEF DESCRIPTION OF THE DRAWINGS

FIG. 3 is a flow diagram in a user equipment associated with switching between different search space groups for monitoring an uplink cancellation indication in connection with ultra-reliable low-latency communication;

FIG. 4 is a flow diagram in a network entity associated with switching between different search space groups for transmitting an uplink cancellation indication in connection with ultra-reliable low-latency communication.

DETAILED DESCRIPTION OF THE PREFERRED EMBODIMENT(S)

Figure 1:
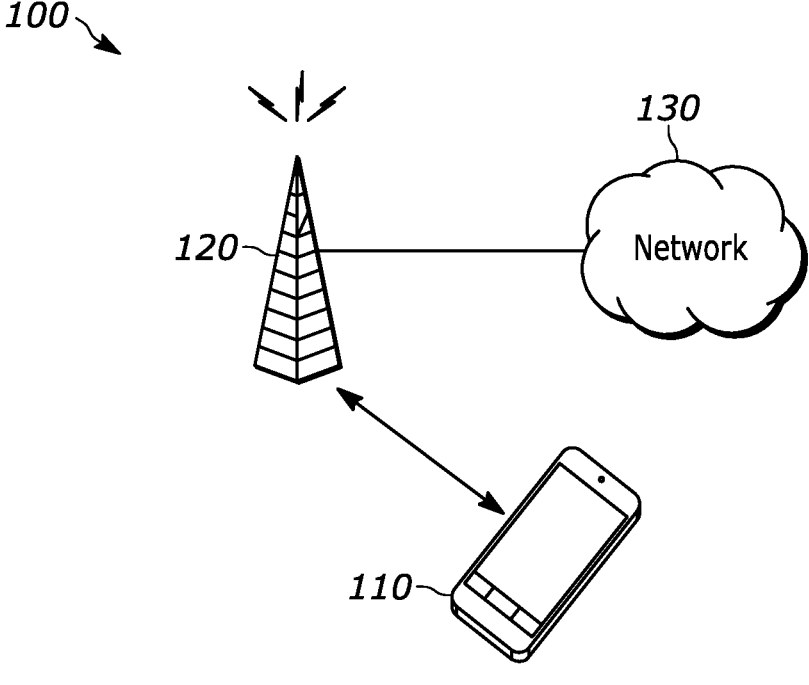
FIG. 1 is a block diagram of an exemplary network environment in which the present invention is adapted to operate.

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus including search space switching for monitoring for uplink cancellation indications, such as in support of ultra-reliable low-latency communication.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In shared spectrum operation (e.g., operation with shared spectrum channel access), a UE can be provided with a first group of search spaces and a second group of search spaces for physical downlink control channel (PDCCH) monitoring in type 3 common search space (CSS) and UE specific search space (USS). DCI format 2-0 can be used to switch between and manage which group of search spaces to be monitored. Also, a timer can be started once the UE is indicated to start monitoring search space group 1, and the timer value can be decreased in every slot. Once the timer expires the UE stops monitoring search space group 1 and switches back to monitoring search space group 0. One intention of the search space switching is to enable power saving (e.g., mini slot monitoring when UE needs to monitor frequently, and slot monitoring when the UE does not need to monitor frequently. For instance, outside channel occupancy time and within channel occupancy time or before reception of a downlink burst in a fixed frame period of Frame based equipment protocol for new radio unlicensed (NRU) operation or operation with shared spectrum channel access). A search space can be monitored in both search space groups; however, the power saving benefits can be reduced (e.g., because PDCCH is always monitored in a search space and if the search space is monitored with relatively short search space monitoring periodicity compared to the case that PDCCH is monitored in the search space for a first period of time, and is monitored in another search space with relatively larger search space monitoring periodicity for a second period of time).

UL cancellation indication (UL CI) is an indication to a UE to stop its uplink transmission (e.g., physical uplink shared channel (PUSCH) or sounding reference signal (SRS)) on resources indicated by UL CI. This feature is useful to stop enhanced mobile broadband (eMBB)/low-priority transmissions of a UE to allow ultra-reliable low-latency communication (URLLC)/high priority transmissions of another UE. To determine, which resources to be canceled, the UE needs to determine a reference time duration. Once, the reference time duration is determined, the indication indicates which time and frequency resources within the reference time duration needs to be canceled. The reference time duration equals UL CI monitoring periodicity (the search space monitoring periodicity in which UL CI is monitored) for monitoring periodicities larger than one slot (or for monitoring periodicity of one slot with a single PDCCH monitoring occasion within a slot) and the reference time duration is determined by UL CI configuration (e.g., provided by timeDurationforCI in timeFrequencyRegion of UplinkCancellation RRC information element) if the UL CI monitoring periodicity is not larger than one slot (and there are more than one PDCCH monitoring occasion within a slot). UL CI is indicated in DCI format 2-4 in a type 3 CSS.

For operation in shared spectrum with different search space groups (when search space switching is configured), the question is whether UL CI should be monitored in a search space(s) all the time or in search spaces of one search space group or in a search space(s) of the first search space group and in a search space(s) of the second search space group (with different monitoring periodicities). In current specifications, there is one UL CI configuration per bandwidth part (BWP). To determine the reference time duration properly, when UL CI is to be monitored in a first search space of the first search space group and a second search space of the second search space group at least wherein the first search space has monitoring periodicity not larger than a slot, and the second search space has longer than a slot periodicity; the UE needs a mechanism to determine the reference time duration for UL CI operation in each search space.

At least one aspect of this disclosure provides mechanisms to determine the reference time duration for UL CI operation in different search spaces with different monitoring periodicities (at least one search space with larger than a slot periodicity and another search space with not larger than one slot periodicity.)

The time/frequency resources corresponding to search spaces and their associated control resource sets (CORESETs) are higher layer configured, leading to higher layer configuration of PDCCH monitoring occasions.

Search space switching, search space configuration, and UL CI details are provided in various 3GPP standards. Various examples of 3GPP standard's sections that may be of interest include a discussion of search space set switching in TS 38.213, entitled technical specification group radio access, NR, physical layer procedures for control. The same 3GPP standard also includes a section on cancellation indication, as well as a section on UE procedure for determining physical downlink control channel assignment, that may be of interest. Further 3GPP standard's section that may be of interest include a discussion of search space configuration in TS 38.331, entitled technical specification group radio access network, NR, radio resource control (RRC) protocol specification. The same 3GPP standard also includes a section on physical downlink control channel (PDCCH) configuration, that may be of interest.

In this section of the written description, examples of various embodiments are provided to enable UL CI monitoring in different search spaces with different monitoring periodicities. In particular, at least for the case that one search space has a larger than a slot monitoring periodicity and another search space has a not larger than one slot monitoring periodicity. For example, when PDCCH monitoring periodicity for a first search space set with the downlink control information (DCI) format 2_4 is one slot and there are more than one PDCCH monitoring occasions in a slot, PDCCH monitoring periodicity for a second search space set with the DCI format 2_4 is larger than one slot.

One use case includes when the different search spaces belong to different search space groups in shared spectrum when search space group switching is configured.

There could be limitations if one UL CI configuration is used for different search spaces with different search space monitoring periodicities. For example, if the reference time duration for a first search set is determined based on timeDurationForCI=n2 (e.g., the reference time duration is RRC configured to be 2 symbols), at most timeGranularityForCI can be 1 or 2 (e.g., the 2 symbols of the reference time duration can be grouped in a single group corresponding to timeGranularityForCI=1 or the 2 symbols of the reference time duration can be grouped in two groups (each group has one symbol of the reference time duration) corresponding to timeGranularityForCI=2). However, if the second reference time duration for a second search space set is determined based on the second search space monitoring periodicity (e.g., 8 slots); then having 1 or 2 group of symbols as indicated by timeGranularityForCI may not be a good choice as it could provide a coarse time granularity. For example, timeGranularityForCI=2 partitions/groups a first 4 slots of an 8-slot duration into a first partition and the second 4 slots of the 8-slot duration into a second partition, and 1 bit in UL CI indicates if an UL transmission in the first partition (comprising 4 slots) needs to be canceled and a second bit in UL CI indicates if an UL transmission in the second partition (comprising 4 later slots) needs to be canceled. In contrast, if the second search space set could be associated to a second UL CI configuration having different parameter values than the parameter values in the first UL CI configuration, a better/finer cancellation indication may be possible. For instance, for the second search space set with 8-slot periodicity, timeGranularityForCI=4 results in having 4 partitions instead of two partitions, and 4 bits instead of 2 bits (with one bit corresponding to each partition) can indicate if an UL transmission in each partition needs to be canceled.

In an embodiment, a first search space set is associated with a first UL Cancellation configuration, and a second search space set is associated with a second UL Cancellation configuration.

In an embodiment, a first search space set is associated with a first UL Cancellation configuration, and a second search space set is associated with a second UL Cancellation configuration if the first search space set and the second search space set have different monitoring periodicities. In some examples, the second UL Cancellation configuration is configured if a group index (provided by searchSpaceGroupIdList-r16 for a search space set) provided for a search space set configured for monitoring PDCCH candidates for a DCI format 2_4 indicates a second search space group (e.g., value of 1 in the searchSpaceGroupIdList-r16 for the search space). In some examples, the second UL Cancellation configuration is configured if a group index (provided by searchSpaceGroupIdList-r16 for a search space set) provided for a first search space set configured for monitoring PDCCH candidates for a DCI format 2_4 and a group index provided for a second search space set configured for monitoring PDCCH candidates for a DCI format 2_4 are different.

In an embodiment, a first search space set is associated with an UL Cancellation configuration, and a second search space set is associated with the same UL Cancellation configuration, however, some of the parameters required for determining resources/transmissions to be canceled in an UL cancellation indication associated with a first search space set can be different than the parameters required for determining resources/transmissions to be canceled in an UL cancellation indication associated with a second search space set. For instance, some of the parameters below can be different. In an example, timeDurationForCI in the UL Cancellation configuration may be only applicable to search space sets that have monitoring periodicity of one slot with more than one PDCCH monitoring occasion within a slot. In another example, some of the UL CI configuration parameters (such as parameters shown below) can be provided more than once in the UL CI configuration, and applicable to different search space sets in which UL CI is monitored. For example, the UL CI configuration, could have two parameters (such as timeGranularityForCI-A and time-GranularityForCI-B taking different values, and timeGranularityForCI-A could be applicable to search space sets with a first monitoring periodicity and/or number of PDCCH monitoring occasions within a slot and timeGranularity-ForCI-B could be applicable to search space sets with a second monitoring periodicity and/or number of PDCCH monitoring occasions within a slot). Alternatively, some parameters of the UL CI configuration can take multiple values, for instance, the UE could be configured with timeGranularityForCI={timeGranularityForCI-A, time-GranularityForCI-B}, whereintimeGranularityForCI-A could be applicable to search space sets with a first monitoring periodicity and/or number of PDCCH monitoring occasions within a slot and timeGranularityForCI-B could be applicable to search space sets with a second monitoring periodicity and/or number of PDCCH monitoring occasions within a slot. In one example, the timeGranularityForCI-A is for a search space set (configured for monitoring PDCCH candidates for a DCI format 2_4) of a first search space group, and timeGranularityForCI-B is for a search space set (for monitoring PDCCH candidates for a DCI format 2_4) of a second search space group. In another example, the UL CI configuration, could have two parameters (such as timeFrequencyRegion and timeFrequencyRegion2 taking different combination of parameters, and timeFrequencyRegion could be applicable to search space sets (configured for monitoring PDCCH candidates for a DCI format 2_4) with a first monitoring periodicity and/or number of PDCCH monitoring occasions within a slot and timeFrequencyRegion2 could be applicable to search space sets with a second monitoring periodicity and/or number of PDCCH monitoring occasions within a slot.

In one example, the timeFrequencyRegion is for a search space set (configured for monitoring PDCCH candidates for a DCI format 2_4) of a first search space group, and timeFrequencyRegion2 is for a search space set (for monitoring PDCCH candidates for a DCI format 2_4) of a second search space group. In one example, the frequencyRegion-ForCI2 parameter in timeFrequencyRegion2 may be omitted and not configured and the UE assumes the same value as for frequencyRegionForCI parameter in timeFrequencyRegion. In some examples, the parameter timeGranularityForCI-B or timeFrequencyRegion2 parameter is configured if a group index (provided by searchSpaceGroupIdList-r16 for a search space set) provided for a search space set configured for monitoring PDCCH candidates for a DCI format 2_4 indicates a second search space group (e.g., value of 1 in the searchSpaceGroupIdList-r16 for the search space). In some examples, the parameter timeGranularityForCI-B or time-FrequencyRegion2 parameter is configured if a group index (provided by searchSpaceGroupIdList-r16 for a search space set) provided for a first search space set configured for monitoring PDCCH candidates for a DCI format 2_4 and a group index provided for a second search space set configured for monitoring PDCCH candidates for a DCI format 2_4 are different.

Uplink Cancellation Configuration

```
UplinkCancellation-r16 ::=              SEQUENCE {
    ci-RNTI-r16                             RNTI-Value,
    dci-PayloadSizeForCI-r16                INTEGER (0..maxCI-DCI-PayloadSize-r16),
    ci-ConfigurationPerServingCell-r16      SEQUENCE (SIZE (1..maxNrofServingCells) ) OF
CI-ConfigurationPerServingCell-r16,
    ...
}
CI-ConfigurationPerServingCell-r16 ::=   SEQUENCE {
    servingCellId                           ServCellIndex,
    positionInDCI-r16                       INTEGER (0..maxCI-DCI-PayloadSize-r16-1),
    positionInDCI-ForSUL-r16                INTEGER (0..maxCI-DCI-PayloadSize-r16-1)
OPTIONAL,    -- Cond SUL-Only
    ci-PayloadSize-r16                      ENUMERATED {n1, n2, n4, n7, n8, n14, n16,
n28, n32, n56, n112},
    timeFrequencyRegion-r16                 SEQUENCE {
        timeDurationForCI-r16                   ENUMERATED {n2, n4, n7}
OPTIONAL,    -- Cond SymbolPeriodicity
        timeGranularityForCI-r16                ENUMERATED {n1, n2, n4, n7, n14,
n28},
        frequencyRegionForCI-r16                INTEGER (0..37949),
        ...
    }
}
```

In one example,

```
CI-ConfigurationPerServingCell-r16 ::=   SEQUENCE {
    servingCellId                           ServCellIndex,
    positionInDCI-r16                       INTEGER (0..maxCI-DCI-PayloadSize-r16-1),
```

-continued

```
    positionInDCI-ForSUL-r16              INTEGER (0..maxCI-DCI-PayloadSize-r16-1)
OPTIONAL,    -- Cond SUL-Only
    ci-PayloadSize-r16                    ENUMERATED {n1, n2, n4, n7, n8, n14, n16,
n28, n32, n56, n112},
        timeFrequencyRegion-r16           SEQUENCE {
            timeDurationForCI-r16             ENUMERATED {n2, n4, n7}
OPTIONAL,    -- Cond SymbolPeriodicity
            timeGranularityForCI-A-r16            ENUMERATED {n1, n2, n4, n7, n14,
n28},
            timeGranularityForCI-B-r16            ENUMERATED {n1, n2, n4, n7, n14,
n28}, OPTIONAL
            frequencyRegionForCI-r16          INTEGER (0..37949),
            ...
    }
}
```

In another example,

```
CI-ConfigurationPerServingCell-r16 ::=    SEQUENCE {
    servingCellId                         ServCellIndex,
    positionInDCI-r16                     INTEGER (0..maxCI-DCI-PayloadSize-r16-1),
    positionInDCI-ForSUL-r16              INTEGER (0..maxCI-DCI-PayloadSize-r16-1)
OPTIONAL,    -- Cond SUL-Only
    ci-PayloadSize-r16                    ENUMERATED {n1, n2, n4, n7, n8, n14, n16,
n28, n32, n56, n112},
    timeFrequencyRegion-r16               SEQUENCE {
        timeDurationForCI-r16                 ENUMERATED {n2, n4, n7}
OPTIONAL,    -- Cond SymbolPeriodicity
        timeGranularityForCI-r16          SEQUENCE {
            timeGranularityForCI-A-r16            ENUMERATED {n1, n2, n4, n7, n14,
n28},
            timeGranularityForCI-B-r16            ENUMERATED {n1, n2, n4, n7, n14,
n28}, OPTIONAL
        }
        frequencyRegionForCI-r16              INTEGER (0..37949),
        ...
    }
}
```

In yet another example,

```
CI-ConfigurationPerServingCell-r16 ::=    SEQUENCE {
    servingCellId                         ServCellIndex,
    positionInDCI-r16                     INTEGER (0..maxCI-DCI-PayloadSize-r16-1),
    positionInDCI-ForSUL-r16              INTEGER (0..maxCI-DCI-PayloadSize-r16-1)
OPTIONAL,    -- Cond SUL-Only
    ci-PayloadSize-r16                    ENUMERATED {n1, n2, n4, n7, n8, n14, n16,
n28, n32, n56, n112},
    timeFrequencyRegion-r16               SEQUENCE {
        timeDurationForCI-r16                 ENUMERATED {n2, n4, n7}
OPTIONAL,    -- Cond SymbolPeriodicity
        timeGranularityForCI-r16              ENUMERATED {n1, n2, n4, n7, n14,
n28},
        frequencyRegionForCI-r16              INTEGER (0..37949),
        ...
    }
    timeFrequencyRegion2-r16              SEQUENCE {
        timeDurationForCI2-r16                ENUMERATED {n2, n4, n7}
OPTIONAL,    -- Cond SymbolPeriodicity
        timeGranularityForCI2-r16             ENUMERATED {n1, n2, n4, n7, n14,
n28},
        frequencyRegionForCI2-r16             INTEGER (0..37949),
    OPTIONAL
        ...
    }            OPTIONAL
}
```

The following embodiments can be related to each other or independent of each other.

In a first embodiment, a UE receives a first UplinkCancellation configuration for a downlink bandwidth part; and receives a second UplinkCancellation configuration for the downlink bandwidth part;

the UE determines, based on the first UplinkCancellation configuration, a first reference time duration associated with a first set of uplink cancellation indications detected in a first set of search spaces/first search space set;

the UE determines a second reference time duration associated with a second set of uplink cancellation indications detected in a second set of search spaces/second search space set; wherein The second reference time duration is determined based on a PDCCH monitoring periodicity associated with the second set of search spaces.

The UE monitors a first set of PDCCH candidates for a detection of a DCI format corresponding to uplink cancellation operation (DCI format 2-4) in the first set of search spaces;

The UE monitors a second set of PDCCH candidates for a detection of the DCI format in the second set of search spaces;

The UE receives, in the first set of search spaces or in the second set of search spaces, an indication by a DCI format 2_4 (UL cancellation indication) for a serving cell;

The UE cancels an UL transmission on the serving cell if the indication indicates time domain resources from a time region (a set of symbols) with the associated reference time duration overlaps with the resources associated with the UL transmission; wherein the associated reference time duration is the first reference time duration if the indication is received in the first set of search spaces; and the associated reference time duration is the second reference time duration if the indication is received in the second set of search spaces;

The UL transmission can comprise at least one of a PUSCH transmission or an SRS transmission. The uplink cancellation operation can be performed for UL transmissions in a shared spectrum. The first set of search spaces and the second set of search spaces can be monitored in a shared/unlicensed spectrum.

The first reference time duration can be smaller than a slot duration (e.g., 2 or 4 or 7 symbols).

There could be more than one PDCCH monitoring occasions associated with the first set of search spaces in a slot.

The first UplinkCancellation configuration can be provided by an UplinkCancellation Information Element in a PDCCH-Config Information Element of the downlink BWP.

The first set of search spaces can be associated with a first searchSpaceGroupID, and the first set of search spaces can be associated with a second searchSpaceGroupID.

The device can start monitoring the first set of search spaces when/after the device stops monitoring the second set of search spaces; and can start monitoring the second set of search spaces when/after the device stops monitoring the first set of search spaces.

The UE can receive a PDCCH such as a group common PDCCH (e.g., with DCI format 2_0) that indicates whether to monitor the first set of search spaces or the second set of search spaces.

In an embodiment, the first UplinkCancellation configuration and the second UplinkCancellation configuration can be the same if the first reference time duration and the second reference time duration are longer than a slot duration or the first reference time duration and the second reference time duration have a slot duration, and there is only one (at most one) PDCCH monitoring occasion within a slot in each of the first set of search spaces and the second set of search spaces.

In an embodiment, the maximum monitoring periodicity of search spaces of the second set of search spaces can be smaller than a threshold. The threshold can be larger than 10 (or 5) slots. The maximum monitoring periodicity of search spaces of the second set of search spaces can be larger than the maximum monitoring periodicity of search spaces of a third set of search spaces; wherein the second set of search spaces can be associated with a shared spectrum and the third set of search spaces is not associated with a shared spectrum (or associated with a licensed spectrum); and the device monitors a third set of PDCCH candidates for a detection of a DCI format corresponding to uplink cancellation operation (DCI format 2-4) in the third set of search spaces for the licensed spectrum operation;

In an embodiment, the first UplinkCancellation configuration and the second UplinkCancellation configuration are the same, and a field in the UplinkCancellation configuration may be mandatory to be present if at least one search space in which DCI format 2-4 is monitored has a periodicity not larger than a slot.

In an embodiment, the first reference time duration is determined based on a field (such as timeDurationForCI) in the UplinkCancellation configuration if the first set of search spaces has monitoring periodicity of not larger than a slot; and the second reference time duration is determined based on the monitoring periodicity of the second set of search spaces when the second set of search spaces has monitoring periodicity larger than a slot.

The first reference time duration can be further determined based on a PDCCH monitoring periodicity associated with the first set of search spaces.

In an embodiment, the UL cancellation indication may only be received in the first set of search spaces or may only be received in the second set of search spaces.

Figure 2:
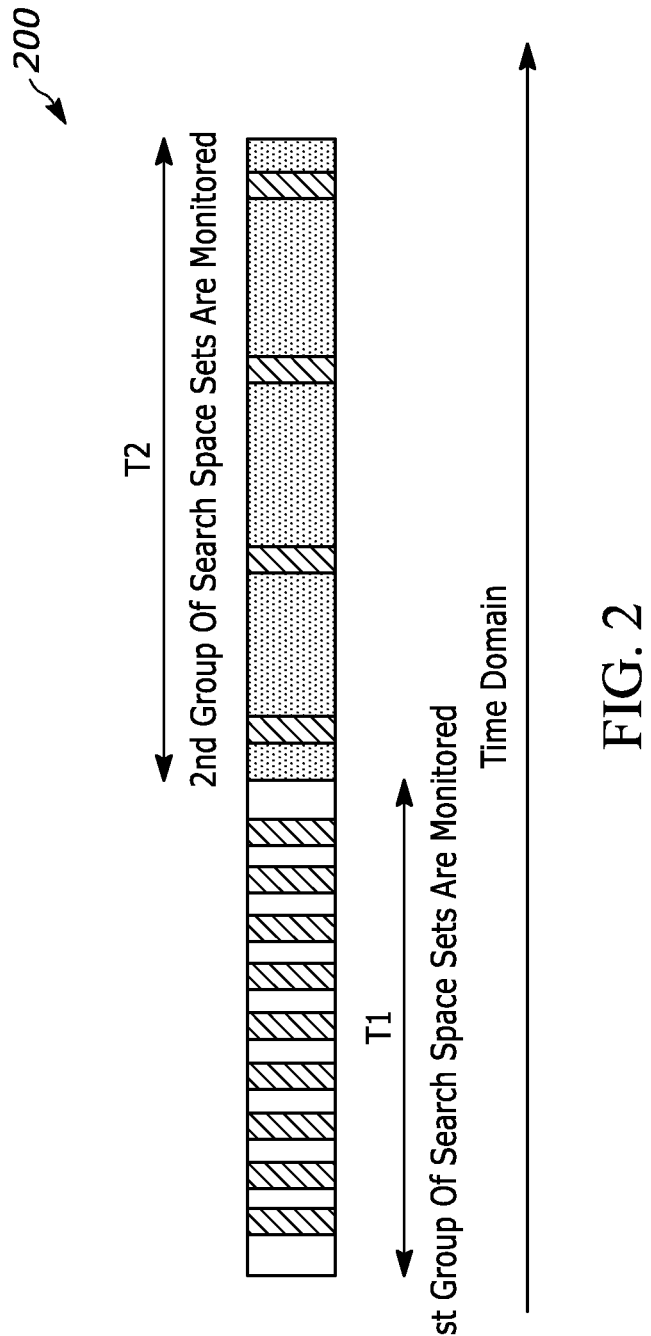
FIG. 2 is a time domain mapping of a first set of time domain resources and a second set of time domain resources respectively corresponding to a first and a second search space each including one or more monitoring occasions.

In an embodiment, if a search space set is configured to be in both search space groups (e.g., when the UE is provided (a) first group index for a respective Type3-PDCCH CSS set or USS set by searchSpaceGroupIdList-r16 for PDCCH monitoring on a serving cell, and (b) second group index for the respective Type3-PDCCH CSS set or USS set by searchSpaceGroupIdList-r16 for PDCCH monitoring on the serving cell), the UE can be configured with a parameter in the respective search space set or with a parameter in UL CI configuration, if the UE is configured with UL CI, wherein the UE can determine PDCCH monitoring occasions for UL CI monitoring in the respective search space set when it is monitored in the first search space group and/or when it is monitored in the second search space group based on the parameter. For example, FIG. 2 illustrates a time domain mapping 200 of a first set of time domain resources and a second set of time domain resources respectively corresponding to a first and a second search space each including one or more monitoring occasions, where the monitoring occasions are identified by the elements in the time domain mapping including parallel diagonal hatching. In FIG. 2, the UE can monitor UL CI according to one UL CI configuration in a search space set, and the search space set belongs to both groups of search space sets. However, the monitoring periodicity of UL CI monitoring in the search space set during the time T2 is different than the monitoring periodicity of UL CI monitoring in the search space set during the time T1, for example, the monitoring periodicity of UL CI monitoring in the search space set during the time T2 is 'n' times the monitoring periodicity of UL CI monitoring in the search space set during the time T1; and 'n' is indicated in the UL CI configuration or 'n' is derived according to a higher layer parameter of search space switching such as searchSpaceSwitchingTimer.

In an embodiment, if the device is not monitoring PDCCH according to the first set of search spaces, the UE starts monitoring PDCCH according to the first set of search spaces, and stops monitoring PDCCH according to the second set of search spaces, on the serving cell at a first slot that is at least $P_{switch}$ symbols after the last symbol of a detected PDCCH with a DCI format 2-0, if a value of the search space set switching field is 0;

if the device is not monitoring PDCCH according to the second set of search spaces, the UE monitors PDCCH according to the second set of search spaces, and stops monitoring PDCCH according to the first set of search spaces, on the serving cell at a first slot that is at least $P_{switch}$ symbols after the last symbol of a detected PDCCH with a DCI format 2-0, and the device sets a timer value to the value provided by searchSpaceSwitchingTimer-r16, if a value of the search space set switching field is 1;

if the device monitors PDCCH on the serving cell according to the second set of search spaces, the device starts monitoring PDCCH on the serving cell according to the first set of search spaces, and stops monitoring PDCCH according to the second set of search spaces, on the serving cell at the beginning of the first slot that is at least $P_{switch}$ symbols after a slot where the timer expires or after a last symbol of a remaining channel occupancy duration for the serving cell that is indicated by DCI format 2-0.

The embodiments above may be also applicable to any group common DCI format (e.g., instead of DCI format indicating UL CI), such as DCI formats 2-0, 2-1, 2-2, 2-3, 2-4, 2-5, 2-6.

Enabling UL cancellation monitoring in search spaces of different search space groups when only search spaces of one search group being monitored; and when the search space group to be monitored is either indicated by reception of a DCI (e.g., DCI format 2-0) indicating the search group index or by an expiration of a timer.

This disclosure provides mechanisms to determine the reference time duration for UL CI operation in different search spaces with different monitoring periodicities (at least one with larger than a slot periodicity and another search space with not larger than one slot periodicity.)

FIG. 3 illustrates a flow diagram 300 in a user equipment associated with switching between different search space groups for monitoring an uplink cancellation indication in connection with ultra-reliable low-latency communication. In accordance with at least one embodiment, the method can include receiving 302 a first uplink cancellation configuration for a downlink bandwidth part. Based on the first uplink cancellation configuration, a first reference time duration associated with a first set of uplink cancellation indications detected in a first set of search spaces can be determined 304. A second reference time duration associated with a second set of uplink cancellation indications detected in a second set of search spaces can be determined 306. Receipt of an uplink cancellation indication can be monitored 308 for in at least one of the first set of search spaces and the second set of search spaces. A particular one of the first reference time duration and the second reference time duration is selectively 310 used in connection with a received uplink cancellation indication dependent upon which one of the first set of search spaces and the second set of search spaces, that is being monitored, is identified as including the received uplink cancellation indication. The particular one is the first reference time duration if the indication is received in the first set of search spaces, and the particular one is the second reference time duration if the indication is received in the second set of search spaces.

In some instances, the determining of the second reference time duration associated with the second set of uplink cancellation indications detected in the second set of search spaces is derived at least in part from the received first uplink cancellation configuration. In some of these instances, the first uplink cancellation configuration can include multiple sets of parameters respectively associated with the determination of each of the first reference time duration and the second reference time duration.

In some instances, the determining of the second reference duration associated with the second set of uplink cancellation indications detected in the second set of search spaces is derived from a second uplink cancellation configuration for a downlink bandwidth part that was received, where the second uplink cancellation configuration is separate from the first uplink cancellation configuration. In some of these instances, the second reference time duration can be determined based on a physical downlink control channel monitoring periodicity associated with the second set of search spaces, which is based on the second uplink cancellation configuration for a downlink bandwidth part that was received.

In some instances, the uplink cancellation indication can be included as part of a downlink control information format included in at least one of a set of physical downlink control channel candidates detected in the at least one of the first set of search spaces and the second set of search spaces that are being monitored.

In some instances, the method can further include canceling an uplink transmission on a serving cell if the uplink cancellation indication identifies time domain resources from a time region associated with the particular one of the first reference time duration and the second reference time duration that overlap with at least some of a set of resources associated with the uplink transmission.

In some instances, the uplink cancellation operation can be performed for uplink transmissions in a shared spectrum.

In some instances, the first reference time duration can be smaller than a slot duration. In some of these instances, there can be more than one physical downlink control channel monitoring occasions associated with the first set of search spaces in a slot.

In some instances, the second reference time duration can be equal to or larger than a slot duration. In some of these instances, a number of physical downlink control channel monitoring occasions associated with the second set of search spaces can be equal to or less than a number of slots.

In some instances, the method can further include receiving a physical downlink control channel with downlink control information that indicates whether to monitor the first set of search spaces or the second set of search spaces.

In some instances, the device can start monitoring the first set of search spaces when the device stops monitoring the second set of search spaces; and can start monitoring the second set of search spaces when the device stops monitoring the first set of search spaces.

In some instances, the first set of search spaces and the second set of search spaces can be monitored in a shared/unlicensed spectrum.

FIG. 4 illustrates a flow diagram 400 in a network entity associated with switching between different search space groups for transmitting an uplink cancellation indication in connection with ultra-reliable low-latency communication. In accordance with at least one embodiment, the method can include transmitting 402 one or more uplink cancellation configurations for a downlink bandwidth part including at least a first uplink cancellation configuration, from which a first reference time duration associated with a first set of uplink cancellation indications detected in a first set of search spaces can be determined, and a second reference time duration associated with a second set of uplink cancellation indications detected in a second set of search spaces can be determined. An uplink cancellation indication can be transmitted 404 in at least one of the first set of search spaces and the second set of search spaces. A particular one of the first reference time duration and the second reference time duration can be selectively used 406 in connection with a received uplink cancellation indication dependent upon which one of the first set of search spaces and the second set of search spaces includes the received uplink cancellation indication. The particular one is the first reference time duration if the indication was transmitted in the first set of search spaces. The particular one is the second reference time duration if the indication was transmitted in the second set of search spaces.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 5:
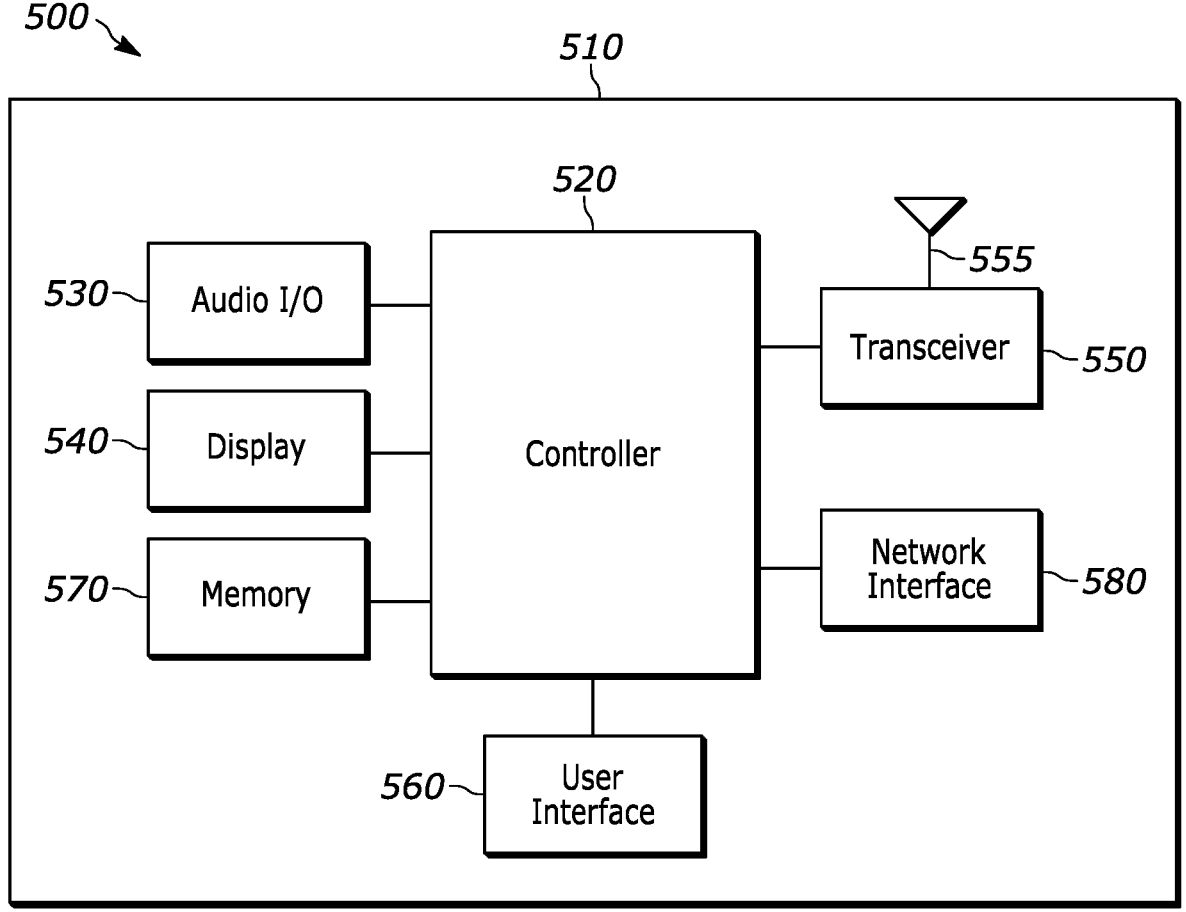
FIG. 5 is an exemplary block diagram of an apparatus according to a possible embodiment.

FIG. 5 is an example block diagram of an apparatus 500, such as the wireless communication device 110, according to a possible embodiment. The apparatus 500 can include a housing 510, a controller 520 within the housing 510, audio input and output circuitry 530 coupled to the controller 520, a display 540 coupled to the controller 520, a transceiver 550 coupled to the controller 520, an antenna 555 coupled to the transceiver 550, a user interface 560 coupled to the controller 520, a memory 570 coupled to the controller 520, and a network interface 580 coupled to the controller 520. The apparatus 500 can perform the methods described in all the embodiments.

The display 540 can be a viewfinder, a liquid crystal display (LCD), a light emitting diode (LED) display, a plasma display, a projection display, a touch screen, or any other device that displays information. The transceiver 550 can include a transmitter and/or a receiver. The audio input and output circuitry 530 can include a microphone, a speaker, a transducer, or any other audio input and output circuitry. The user interface 560 can include a keypad, a keyboard, buttons, a touch pad, a joystick, a touch screen display, another additional display, or any other device useful for providing an interface between a user and an electronic device. The network interface 580 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 570 can include a random access memory, a read only memory, an optical memory, a solid state memory, a flash memory, a removable memory, a hard drive, a cache, or any other memory that can be coupled to an apparatus.

The apparatus 500 or the controller 520 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 570 or elsewhere on the apparatus 500. The apparatus 500 or the controller 520 may also use hardware to implement disclosed operations. For example, the controller 520 may be any programmable processor. Disclosed embodiments may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 520 may be any controller or processor device or devices capable of operating an apparatus and implementing the disclosed embodiments. Some or all of the additional elements of the apparatus 500 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method performed by a user equipment (UE), the method comprising:

receiving a first uplink cancellation configuration for a downlink bandwidth part;

determining, based on the first uplink cancellation configuration, a first reference time duration associated with a first set of uplink cancellation indications detected in a first set of search spaces, wherein the first reference time duration is less than a slot duration;

determining a second reference time duration associated with a second set of uplink cancellation indications detected in a second set of search spaces, wherein the second reference time duration is equal to or greater than a slot duration;

monitoring the first set of search spaces and the second set of search spaces for an uplink cancellation indication;

receiving the uplink cancellation indication in at least one of the first set of search spaces or the second set of search spaces, wherein the uplink cancellation indication identifies a set of time domain resources with an associated time duration;

selecting, as the associated time duration, the first reference time duration when the uplink cancellation indication is received in the first set of search spaces, and the second reference time duration when the uplink cancellation indication is received in the second set of search spaces;

determining whether the set of time domain resources identified by the uplink cancellation indication overlaps with a set of resources allocated for an uplink transmission based at least in part on the selected associated time duration; and canceling the uplink transmission based at least in part on the set of time domain resources overlapping with the set of resources allocated for the uplink transmission.

2. The method according to claim 1, wherein determining the second reference time duration is based at least in part on the first uplink cancellation configuration.

3. The method according to claim 2, wherein the first uplink cancellation configuration includes multiple sets of parameters respectively associated with the determination of each of the first reference time duration and the second reference time duration.

4. The method according to claim 1, further comprising receiving a second uplink cancellation configuration for the downlink bandwidth part, wherein the second uplink cancellation configuration is separate from the first uplink cancellation configuration, and wherein the second reference time duration is determined based at least in part on the second uplink cancellation configuration.

5. The method according to claim 4, further comprising determining, based at least in part on the second uplink cancellation configuration, a physical downlink control channel (PDCCH) monitoring periodicity associated with the second set of search spaces, wherein determining the second reference time duration is based at least in part on the PDCCH monitoring periodicity.

6. The method according to claim 1, wherein the uplink cancellation indication is included as part of a downlink control information format included in at least one of a set of physical downlink control channel (PDCCH) candidates detected in at least one of the first set of search spaces or the second set of search spaces.

7. The method according to claim 1, wherein the uplink transmission is scheduled in a shared spectrum.

8. The method according to claim 1, wherein more than one physical downlink control channel (PDCCH) monitoring occasions are associated with the first set of search spaces in a slot.

9. The method according to claim 1, further comprising receiving a physical downlink control channel (PDCCH) with downlink control information that indicates whether to monitor the first set of search spaces or the second set of search spaces.

10. The method according to claim 1, wherein the UE:

starts monitoring the first set of search spaces when the UE stops monitoring the second set of search spaces; and starts monitoring the second set of search spaces when the UE stops monitoring the first set of search spaces.

11. A user equipment (UE) for wireless communication, comprising:

at least one memory; and at least one processor coupled with the at least one memory and configured to cause the UE to:

receive a first uplink cancellation configuration for a downlink bandwidth part;

determine, based on the first uplink cancellation configuration, a first reference time duration associated with a first set of uplink cancellation indications detected in a first set of search spaces, wherein the first reference time duration is less than a slot duration;

determine a second reference time duration associated with a second set of uplink cancellation indications detected in a second set of search spaces, wherein the second reference time duration is equal to or greater than a slot duration;

monitor the first set of search spaces and the second set of search spaces for an uplink cancellation indication;

receive the uplink cancellation indication in at least one of the first set of search spaces or the second set of search spaces, wherein the uplink cancellation indication indicates a set of time domain resources with an associated time duration;

select, as the associated time duration, the first reference time duration when the uplink cancellation indication is received in the first set of search spaces, and the second reference time duration when the uplink cancellation indication is received in the second set of search spaces;

determining whether the set of time domain resources indicated in the uplink cancellation indication overlaps with a set of resources allocated for an uplink transmission based at least in part on the selected associated time duration; and cancel the uplink transmission based at least in part on the set of time domain resources overlapping with the set of resources allocated for the uplink transmission.

12. The UE according to claim 11, wherein determining the second reference time duration is based at least in part the first uplink cancellation configuration.

13. The UE according to claim 12, wherein the first uplink cancellation configuration includes multiple sets of parameters respectively associated with the determination of each of the first reference time duration and the second reference time duration.

14. The UE according to claim 11, wherein the at least one is further configured to cause the UE to receive a second uplink cancellation configuration for the downlink bandwidth part, wherein the second uplink cancellation configuration is separate from the first uplink cancellation configuration, and wherein the second reference time duration is determined based at least in part on the second uplink cancellation configuration.

15. A method performed by a network entity, comprising:
transmitting a first uplink cancellation configuration for a downlink bandwidth part, wherein the first uplink cancellation configuration corresponds to a first reference time duration associated with a first set of uplink cancellation indications detected in a first set of search spaces, and wherein the first reference time duration is less than a slot duration;
transmitting a second uplink cancellation configuration for the downlink bandwidth part, wherein the second uplink cancellation configuration corresponds to a second reference time duration associated with a second set of uplink cancellation indications detected in a second set of search spaces, and wherein the second reference time duration is equal to or greater than a slot duration; and
transmitting an uplink cancellation indication in at least one of the first set of search spaces or the second set of search spaces, the uplink cancellation indication identifying a set of time domain resources with an associated time duration, wherein the associated time duration is the first reference time duration when the uplink cancellation indication is transmitted in the first set of search spaces, and wherein the associated time duration is the second reference time duration when the uplink cancellation indication is transmitted in the second set of search spaces.

16. The method according to claim 15, wherein the first uplink cancellation configuration indicates the first reference time duration.

17. The method according to claim 15, wherein the first reference time duration is based at least in part on a physical downlink control channel (PDCCH) monitoring periodicity associated with the first set of search spaces.

18. The method according to claim 15, wherein the second reference time duration is based at least in part on a physical downlink control channel (PDCCH) monitoring periodicity associated with the second set of search spaces.

19. The method according to claim 15, wherein the uplink cancellation indication is included as part of a downlink control information format included in at least one of a set of physical downlink control channel (PDCCH) candidates in at least one of the first set of search spaces or the second set of search spaces.

20. A network entity for wireless communication, comprising:
at least one memory; and
at least one processor coupled with the at least one memory and configured to cause the network entity to:
transmit a first uplink cancellation configuration for a downlink bandwidth part, wherein the first uplink cancellation configuration corresponds to a first reference time duration associated with a first set of uplink cancellation indications detected in a first set of search spaces, and wherein the first reference time duration is less than a slot duration;
transmit a second uplink cancellation configuration for the downlink bandwidth part, wherein the second uplink cancellation configuration corresponds to a second reference time duration associated with a second set of uplink cancellation indications detected in a second set of search spaces, and wherein the second reference time duration is equal to or greater than a slot duration; and
transmit an uplink cancellation indication in at least one of the first set of search spaces or the second set of search spaces, the uplink cancellation indication identifying a set of time domain resources with an associated time duration, wherein the associated time duration is the first reference time duration when the uplink cancellation indication is transmitted in the first set of search spaces, and wherein the associated time duration is the second reference time duration when the uplink cancellation indication is transmitted in the second set of search spaces.

* * * * *